Figure 1:
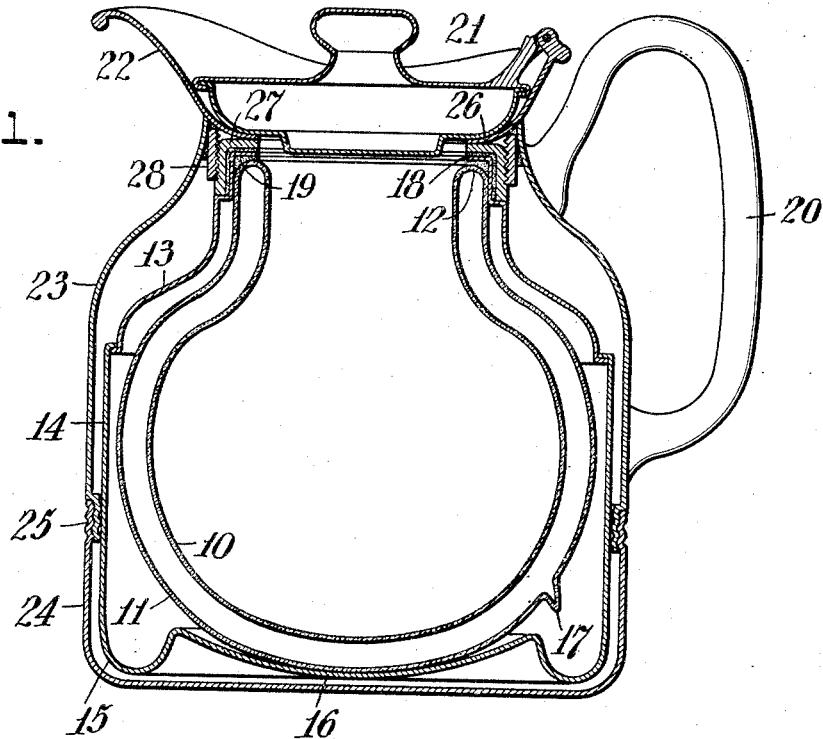

May 27, 1930.　　　F. SIEGHEIM　　　1,760,378
VACUUM WALLED CONTAINER
Filed June 23, 1928　　2 Sheets-Sheet 1

INVENTOR
*Fritz Siegheim*
BY
ATTORNEYS

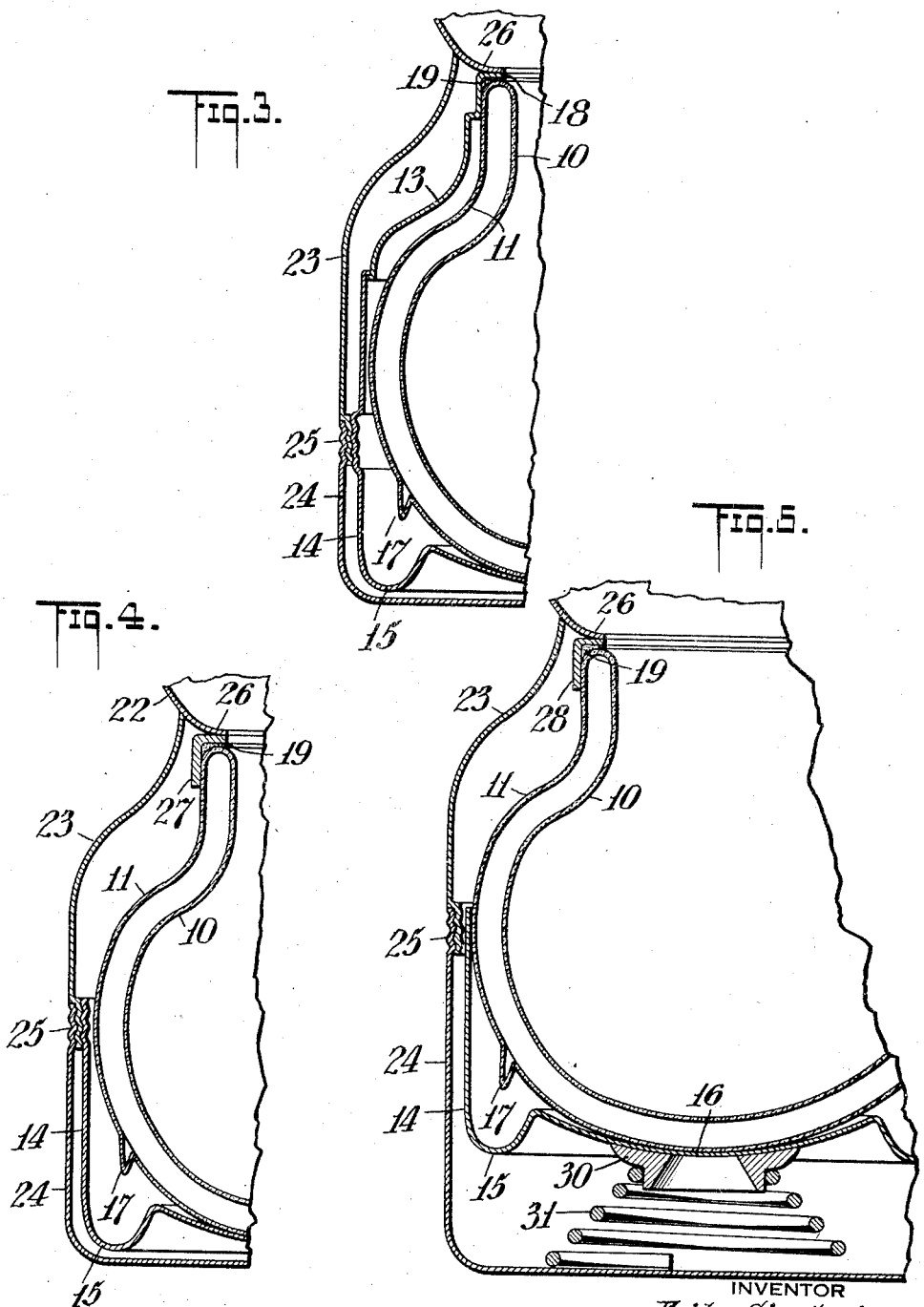

Patented May 27, 1930

1,760,378

UNITED STATES PATENT OFFICE

FRITZ SIEGHEIM, OF NEW YORK, N. Y.

VACUUM-WALLED CONTAINER

Application filed June 23, 1928. Serial No. 287,838.

In the manufacture of double walled glass vessels it is difficult to form the surface of the blown glass at the end of the neck in a true plane at right angles to the axis of the vessel, whereby it may seat against and form a liquid-tight joint with a lip or outlet part of a projecting jacket or casing. Even if the surface be perfectly formed it often happens that in assembling the vessel and its jacket, the parts are not properly registered or the vessel is yieldingly supported in the casing so that the desired tight joint is not insured.

If this tight joint is not formed and maintained, a small portion of the liquid being poured into or out of the vessel may leak into the space between the vessel and the casing. Dish water may also get into said space during the washing of the vessel as it is not the usual practice to separate the vessel from its jacket each time the vessel is washed.

As the same vessel may be used with different liquids, such as, coffee, chocolate, etc., at different times, and as there may be rust on the inner surface of the casing a very unpalatable and even toxic liquid mixture may accumulate in this space, and portions of it flow out with the potable liquid as the latter is being poured out of the vessel for use. Highly objectionable contamination of the potable liquid thus occurs.

The use of rubber or other yielding gasket between the parts to prevent the leakage referred to is not entirely satisfactory as the gasket soon loses its efficiency due to the widely varying conditions, particularly as to temperature, to which it is subjected.

The end of the vessel mouth is subjected to the greatest heat variations because of its exposure to the air and its conducting relationship to the jacket or casing. This is the portion of the vessel where fusing of the glass usually occurs in forming the vessel and therefore there may be internal strains in the glass increasing the liability of breakage. Unless this edge portion is protected it is liable to breakage upon pouring in very hot or cold liquids or in handling. If such protecting means extend inwardly beyond the inner surface of the vessel mouth it is difficult to clean beneath the edge thereof, and solids collecting in this groove, channel or recess will contaminate the contents of the vessel during the pouring out of the contents.

The main object of my invention is to provide a construction whereby the forming of a tight joint between the vessel mouth and the rim of the jacket or casing is insured and which at the same time permits of ready separation and accurate reassembling.

A further object is to provide a double metal protecting wall at the mouth of the vessel and which at the same time in combination with the vessel itself presents a substantially straight inner surface which presents no groove or recess which cannot be readily cleaned.

In carrying out my invention I provide a glass vessel with a permanently attached metal top presenting a true plane surface which may be directly abutted against a corresponding metal surface of the outer casing to provide a liquid-tight joint or seal.

As a further feature I provide for use in combination with these two plane metal abutting surfaces a threaded connection between the vessel and the outer jacket whereby the accurate centering or aligning of the parts is insured, the pressing together of the abutting metal surfaces is facilitated, and the separation of the parts and reassembling of them also facilitated.

As a further feature I form the plane abutting surface and the connecting threads on a single annular metal member which is in the form of a ring permanently attached to and encircling the mouth of the glass vessel. Although this feature is important it is not essential as the abutting surface may be formed on one member at the mouth of the bottle and the threads formed on a separate member adjacent to the mouth or encircling the body portion of the vessel.

As a further feature I entirely enclose the glass vessel in a sheet metal casing formed of two parts permanently connected together. Thus the vessel may, if desired, be used independent of the outer jacket and will be protected during ordinary handling. Leakage into the space between this inner casing and the glass wall may be insured by the use of cement, and the end of the casing itself may present the plane metal abutting surface for contact with an opposed surface of an inner jacket. This feature although desirable is not essential so far as certain of the other features of my invention are concerned as this inner jacket might be omitted and the metal collar with its abutting surface and its screw threads directly cemented to the vessel around the mouth thereof.

In the accompanying drawings I have illustrated certain embodiments of my invention.

In these drawings:

Fig. 1 is a central longitudinal section through a container embodying my invention; and Figs. 2, 3, 4, and 5 are sectional details of other forms.

In the construction illustrated in Fig. 1 there is employed a glass vessel having inner and outer walls 10 and 11 forming a body portion and a neck. The walls are sealed together and the space therebetween is evacuated so as to provide the usual vacuum walled vessel.

In the making of such vessels the inner and outer walls are usually fused together at or near the lip or outer end 12 of the neck and the forming of this lip or end surface in a true plane at right angles to the axis of the vessel is often a rather difficult matter.

In the construction illustrated the glass vessel is provided with an inner metal casing including upper and lower parts 13 and 14 permanently secured together by spinning an edge of one over a flange of the other or by soldering or in any other suitable manner. The walls of this casing are spaced from the outer glass wall 11 except at the upper end of the neck and along a comparatively small portion of the bottom.

The casing is provided with a depending annular bead 15 at its lower end which holds the main portion of the bottom above the supporting surface and inside of this bead there is a concave bottom portion 16 for direct engagement with the bottom of the outer glass wall 11. The bead 15 forms an inner annular groove which may receive the projection 17 where the sealing off is effected after forming the vacuum.

The upper end of the upper casing has an inwardly extending annular flange 18 which presents a true upper metal surface and may or may not directly contact with the lip or surface portion 12. The space between the flange 18 and the lip 12 is filled with a suitable cement 19 which will form a water-tight joint therebetween and which will not be affected by changes in temperature or by contact with hot liquids.

If the lip 12 be substantially true very little cement will be required, the cement only serving to take care of irregularities between the metal surface and the glass surface.

The parts should be held together so that there is a snug fit at this point at all times and irrespective of expansion or contraction of the metal.

The dished bottom 16 of the casing is sufficient to take care of any movement due to the different coefficients of expansion of the glass and metal and without subjecting the glass to undue strain or bending the cemented joint.

The inner casing is mounted within an outer jacket or casing which may be in the form of a pitcher provided with a handle 20, a cover 21 and a pouring spout or lip 22. This jacket is formed of two sections 23 and 24 which are detachably secured together in any suitable manner as for instance by screw threads 25. This jacket is preferably of somewhat thicker metal than the inner casing 13, which latter may be of comparatively thin stock. The jacket may be silver plated, decorated or treated in any suitable manner to give an attractive or ornamental appearance.

This outer casing has an inwardly extending annular flange or top 26 and it is important that the inner vessel make a tight joint with this flange without the use of gaskets or tapered seats. It is also important that the vessel be held firmly against the flange at all times when the vessel is in use or ready for use.

In order to accomplish this object I provide, in the construction shown in Fig. 1, a collar 27 which has a cylindrical portion soldered on to the outer surface of the neck of the metal casing 13, and a horizontal flange extending inwardly at the upper end. This flange has a plane upper surface which may be forced against the plane under surface of the flange 16.

The outer jacket 23 has a depending flange 28 rigid with the top wall or flange 26 and depending therefrom, and internally threaded. The exterior of the collar is similarly threaded so that by extending the vessel with its casing 13 into the outer jacket and screwing the parts together, the desired tight joint will be formed.

The internal diameters of the flange 26 and of the collar 27 are substantially the same and such that they project inwardly over the top of the glass vessel, but not so as to leave any groove or grooves within which solid material may collect or into which liquid may enter.

After the inner vessel has been inserted and secured in place the bottom 24 of the outer jacket may be attached by the screw threads 25. Preferably this outer jacket is spaced from the annular bead 15 on the bottom of the inner casing.

In the construction shown in Fig. 1 it is not important that the flange 18 be employed as this flange may be omitted and the parts so proportioned that the inner surface of the collar 27 comes closely adjacent to the glass lip 12 and any remaining space be filled by the cement 19. What is important is that the glass vessel have a metal part at the mouth which presents a true horizontal surface which may be forced against a true horizontal surface of the jacket by means of screw threads.

Figure 2:
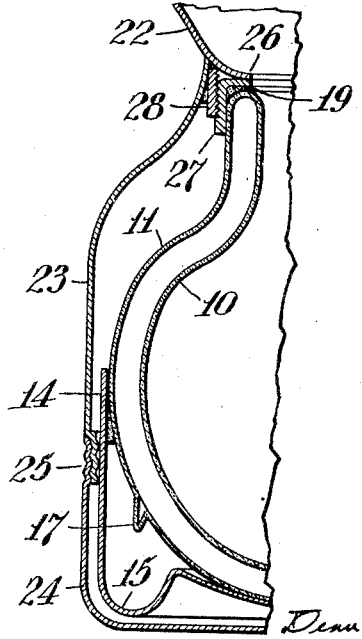

In Fig. 2 I have shown a construction in which the collar 27 and the depending flange are used the same as in Fig. 1, but in which the collar is directly cemented to the glass and the upper half 13 of the casing is omitted. The lower half 14 of the casing is used substantially the same as in Fig. 1, except that it is cemented to the body of the glass vessel at approximately the point of maximum diameter. This lower casing half serves to reinforce and strengthen the glass vessel, protect the bottom, and permit the vessel to stand upright when removed from the jacket. If these advantages are not desired the metal casing part 14 may be omitted.

In Fig. 3 I have shown a construction similar to Fig. 1, but in which the collar 27 and flange 28 are omitted. The flange 18 of the metal casing abuts directly against the top wall or flange 26. The threads for holding the metal surfaces of the parts 18 and 26 together are disposed around the body of the vessel instead of around the neck. The lower casing part 14 is provided with screw threads intermediate of its ends which may engage with the inner side of the threaded part 25 of the upper jacket part 23. After these parts have been screwed together the lower part 24 of the jacket may be screwed onto the outer side of the part 23 on the same screw threads.

In Fig. 4 I have illustrated a construction which embodies the same broad invention and the same parts, but combined in a little different manner. The upper half 13 of the inner casing is omitted and the collar 27 is directly cemented to the glass as in Fig. 2, but the threads on the collar and the flange 28 are omitted. The lower half 14 of the inner casing is cemented to the lower half of the glass vessel as in Fig. 2, but is provided with threads at its upper end for engaging the threads of the outer jacket as in Fig. 3.

Althought it is preferable that the inner vessel be held in place by screw threads, the type of lower half 14 of the inner casing which I have illustrated is capable of use in a construction in which no such screw threads are employed. The bead 15 of this lower casing half serves as a support for the glass vessel so that the latter will stand up in spite of the rounded character of the bottom of the glass vessel itself. The portion which engages the supporting surface, namely, the bead 15, is spaced away from the glass so that if it be dented or struck against the supporting surface there will be no liability of breaking the glass. The portion which engages the bottom of the glass vessel is above the lower edge of the bead 15 so that it is protected and the bead serves to protect the projecting sealing off point 17 of the glass vessel.

In Fig. 5 I have shown a form in which this lower casing part is employed and the vessel is held in place by a rubber pad 30 and a coil spring 31. In separating the two parts of the outer jacket there is no possibility of the spring or pad striking against the sealing off projection 17 and breaking it as is the case in certain commercial constructions in which there is no part corresponding to the lower sections 14 of the inner casing.

The lower casing part 14 serves to reinforce and protect the bottom of the glass vessel, protect the sealing off point, and permit the inner vessel to stand upright when removed from the jacket, but it also, by its engagement in the concave side of the pad 30, centers the vessel to give a proper seat at its neck. It also distributes the pressure of the spring to a wider area of the vessel.

Having thus described my invention, what I claim as new and desire to secure by Letters Patent is:

1. A heat insulated container having an outer metal jacket formed of two separable sections, one of said sections being provided with an annular inwardly extending flange presenting a plane transverse inner surface, a double walled glass vessel having an annular metal part secured to the neck thereof presenting an upper plane transverse surface adapted to directly abut against the first mentioned surface to form a tight joint, and means for rigidly securing the vessel within the jacket to the first mentioned section of said jacket with said surfaces in firm contact and independent of the other section.

2. A heat insulated container having an outer metal jacket provided with an annular inwardly extending flange presenting a plane transverse inner surface, a double walled glass vessel having an annular metal part at the neck thereof presenting an upper plane transverse surface adapted to directly abut against the first mentioned surface to form a tight joint, and screw threaded connections between said vessel and said casing for holding said surfaces in firm engagement.

3. A heat insulated container having an outer metal jacket provided with an annular inwardly extending flange presenting a plane transverse inner surface, a double walled glass vessel having an annular metal part at the neck thereof presenting an upper plane transverse surface adapted to directly abut against the first mentioned surface to form a tight joint, said flange and part having substantially the same internal diameters approximating, but not smaller than the internal diameter of the neck of the vessel, and screw threaded connections between said vessel and said casing for holding said surfaces in firm engagement.

4. A container including a jacket having an inwardly extending annular flange at the top and a depending cylindrical flange carried by said top and spaced from the inner edge of the latter, a double walled glass vessel having an annular collar secured to the neck thereof and having a plane upper surface for abutting engagement with said first mentioned flange, and a threaded external surface for engagement with said second mentioned flange.

5. A container including a jacket having an inwardly extending annular flange, a glass vessel having a collar secured to the neck portion thereof and including an inwardly extending flange for directly engaging the under surface of said first mentioned flange, a cylindrical part encircling the neck, and threaded connections between said vessel and said jacket for holding said flanges in firm engagement.

6. A container including a jacket having an inwardly extending annular flange, a glass vessel having a collar secured to the neck portion thereof and including an inwardly extending flange for directly engaging the under surface of said first mentioned flange, a cylindrical part encircling the neck, and threaded connections between said vessel and said jacket for holding said flanges in firm engagement, the internal diameters of said flanges being substantially equal and also substantially equal to the diameter of the end of the neck of the glass vessel, whereby said end is protected and a substantially smooth inner surface is presented.

7. A container including an outer jacket having an inwardly extending top flange and a depending internally threaded flange of larger diameter, a double walled glass vessel having a metal casing presenting an inwardly extending flange at the top thereof cemented to the end of the neck of the vessel, a collar secured to said jacket and having a portion for direct abutting engagement with said first mentioned flange, and a threaded part for engaging said second mentioned flange.

8. A container including an outer jacket having an inwardly extending top flange and a depending internally threaded flange of larger diameter, a double walls glass vessel having a metal casing presenting an inwardly extending flange at the top thereof cemented to the end of the neck of the vessel, and a bottom part contacting with the central portion of the bottom of the glass vessel and having an annular bead extending below said portion and spaced from the wall of the glass vessel, a collar secured to said casing and having a portion for direct abutting engagement with said first mentioned flange, and a threaded part for engaging said second mentioned flange.

9. A container including a double walled glass vessel having a convex bottom, and a cup-shaped casing part cemented to the vessel around the peripheral wall and having a concave bottom and a depending annular bead for holding the bottom above a supporting surface.

10. A container including a double walled glass vessel having a convex bottom and a sealing off point near one edge thereof, and a cup-shaped casing part cemented to the vessel around the peripheral wall and having a concave bottom engaging the bottom of the glass vessel and a depending annular bead for holding the bottom above a supporting surface and receiving and protecting said sealing off point.

Signed at New York, in the county of New York and State of New York, this 21st day of June, A. D. 1928.

FRITZ SIEGHEIM.